Oct. 20, 1942.   F. G. PURINTON   2,299,493
REINFORCED PLASTIC BUTTON
Filed March 24, 1941

Inventor:
Forrest G. Purinton,
By Parker Cook Attorney.

Patented Oct. 20, 1942

2,299,493

UNITED STATES PATENT OFFICE 2,299,493

REINFORCED PLASTIC BUTTON

Forrest G. Purinton, Waterbury, Conn., assignor to The Patent Button Company, Waterbury, Conn., a corporation of Connecticut Application March 24, 1941, Serial No. 385,020

1 Claim. (Cl. 24—90)

My invention relates to new and useful improvements in reinforced plastic buttons, and has for an object to produce a plastic button that is relatively inexpensive to manufacture and, at the same time, will withstand the hard usage to which a button of this type is subjected.

Another object of the present invention is to produce a plastic button that is reinforced about the hub, so that when a fastener is driven up into a bore in the hub, there is less likelihood of the hub splitting.

A further object of the invention is to produce a plastic button having a central bore of a certain diameter, into which a fastener of a slightly greater diameter is to be driven, somewhat similar to the arrangement shown in the application filed by me, William A. Zwiebel and Harold N. Verzier on January 3, 1939, bearing Serial Number 249,138, and allowed October 26, 1940, for Tack buttons.

Still another object of the invention, therefore, is to produce a plastic button, the hub of which has embedded near the outer walls a metal ferrule, so that as the walls about the bore expand slightly when the fastener is driven into the bore, the possibility of the walls of the bore splitting is greatly reduced.

Still another object of the invention is to produce a very inexpensive button formed of relatively cheap plastic and an embedded metal ferrule.

Still another object of the invention is to provide a reinforced plastic button that is extremely simple to manufacture in that plastic in the form of disks may be superimposed on the ferrule in the die cavities, so that when the plastic is molded, it will fill the ferrule and cover the side walls of the ferrule with a thin coating to thus substantially hide the ferrule with the exception of the bottom surface.

Still another object of the invention is to provide a plastic button that will not reflect much light as the body of the button is black and the bottom of the ferrule may be oxidized. In the same manner, the cap on the fastening member may be oxidized to prevent the reflection of light. This is desirable when the buttons are used for army purposes, such as on a tent, tarpaulin, etc.

Still another object of the invention is to produce a very economical reinforced plastic button that does not call for any dies or anchors, as is usually necessary, for turning the prong of a fastener and does not call for a body shell to protect the plastic but, on the other hand, utilizes a small metal ferrule to prevent the encased hub from splitting during the attaching operation.

Still another object of the invention is to produce a button such as above-described, on which may be placed an insignia cap, if so desired.

With these and other objects in view, the invention consists in certain new and novel arrangements and combination of parts, as will be hereinafter more fully described and pointed out in the claim.

Referring now to the drawing showing a preferred embodiment and one slight modification, Fig. 1 is a cross section, on an enlarged scale, of a button as attached to a fabric;

Figure 1:
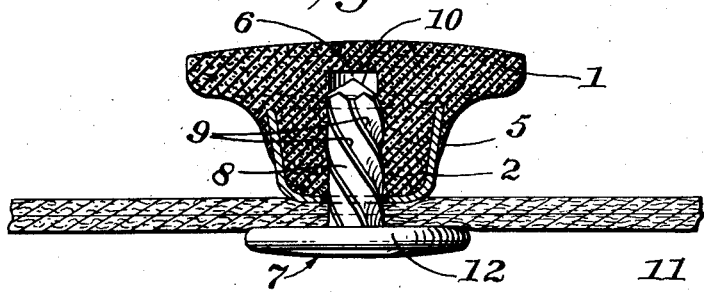
Figure 2:
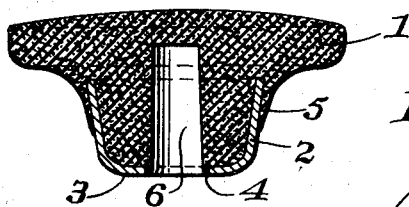
Fig. 2 is a similar section of the button without the attaching element.
Figure 4:
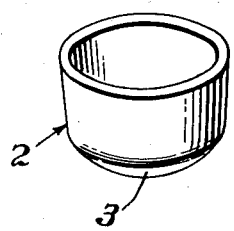
Fig. 4 is a perspective view of the ferrule as viewed from the bottom.

Referring now to the drawing and for the moment to the preferred embodiment, there is shown in Fig. 1 the button head 1, which is formed of any desirable plastic, such as Bakelite, and there will be noticed embedded within the hub the metal ferrule 2, which may be of brass or other metal. This ferrule has the side walls extending substantially well up into the hub, as may be seen in Figs. 1 and 2.

Figure 5:
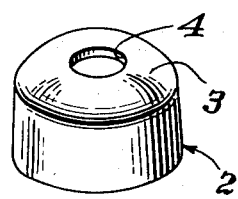
Fig. 5 is a perspective view of the ferrule as viewed from the top.
Figure 3:
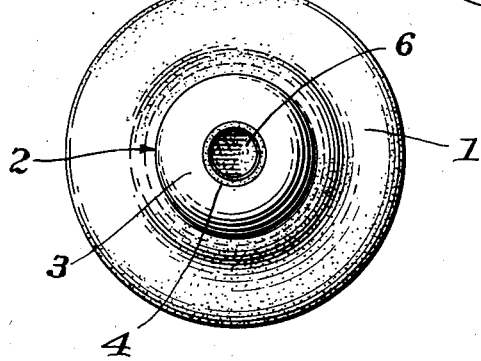
Fig. 3 is a bottom view of the same.

The ferrule is preferably of thin brass and, as may also be seen in Fig. 5, is perforated in its bottom, as shown at 4. The bottom of the ferrule is slightly domed, as may be seen in the several figures, and it will be noticed that the plastic of the button head extends around the outer walls of the ferrule, as may be seen at 5.

The plastic, however, terminates slightly—that is, on the outside of the ferrule—short of the bottom of the ferrule. This part of the exposed ferrule may be oxidized, if desired, so that the button head and its ferrule will appear from the outside to be dark.

The button head is provided with a central bore 6 that extends well up into the head of the button and it is this bore that receives a fluted fastener 7 when the button is attached.

Referring to the fastener 7 for the moment, it is similar to the one shown in the application heretofore-mentioned and consists of the prong 8 with the flutes 9 thereon. The prong is slightly pointed, as at 10, so that it will readily pierce the cloth 11 when it is to be driven into the aforementioned bore in the button head.

The diameter of the prong is several thousandths greater than the diameter of the bore in the button head, so that when the fastening member is driven into the bore, it will tend to expand the walls about the bore to thus tightly grip the prong of the fastener. The opening 4 in the ferrule is large enough in diameter to permit the quick entrance of the prong of the fastener. The cap 12 of the fastener may be oxidized so that neither the button nor the fastener will reflect any light. This is at times desirable, as when the buttons are used for certain army equipment.

By providing this ferrule, it will be understood that when the prong of the fastening member is driven into the bore of the button head, the side walls of the ferrule, tightly encasing the plastic hub, will tend to prevent the same from splitting, and even should the plastic split, the parts will be tightly held within the confines of the ferrule.

Figure 6:
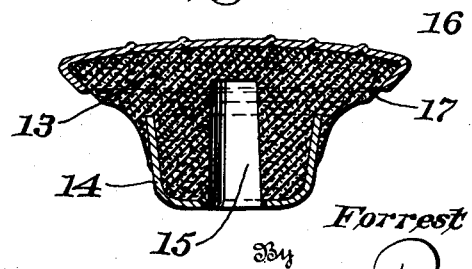
Fig. 6 is a cross section of a slightly modified form showing a metal insignia cap on the face of the button.

In Fig. 6, I have shown a similar button head 13 with its metal-embedded ferrule 14 and its central bore 15, but in this instance a metal insignia cap 16 is gripped about the outer peripheral flange 17 of the button head. This cap may have any insignia or trade-mark thereon as called for by the purchaser.

From the foregoing, it will be seen that I have produced an extremely economical button in that there is only the plastic head and the embedded metal ferrule, which ferrule, however, will prevent the walls about the hub from splitting during the driving of the tack fastener into the bore.

The button may also be produced in a very rapid and economical manner, as the ferrule may be set in the die cavity (not shown), a plastic pill or wafer superimposed, and the mold closed and flashed to thereby mold the plastic with the embedded ferrule, the opening in the ferrule registering with the molded receiving bore of the button.

Finally, it will be seen that the button is of pleasing appearance, economical to manufacture, and especially strong in construction, as the metal ferrule acts as a band to strengthen the hub and the bottom of the metal ferrule also will protect the end wall of the hub to thus prevent the same from chipping or cracking.

Having thus described my invention, what I claim as new and desire to secure by Letters Patent is:

A reinforced plastic button including a plastic head together with a hub, the said hub provided with an axial bore to receive the prong of a fastener of slightly greater diameter than the diameter of the bore, a metal ferrule substantially encasing the distal end of the hub and the side walls of the ferrule being embedded slightly below the surface of the walls of the hub at a point slightly remote from the distal end, the said side walls of the hub also extending well up into the hub and about a plane where the hub merges with the body of the button, the said ferrule having an opening in its bottom registering with the bore in the hub, and the metal ferrule adapted to strengthen the bottom end of the hub as well as the side walls of the hub and prevent the latter from cracking during the driving of a fastening member into the bore of the button head.

FORREST G. PURINTON.